(12) United States Patent
Yamaoka et al.

(10) Patent No.: US 9,504,962 B2
(45) Date of Patent: Nov. 29, 2016

(54) GAS-SEPARATING MEMBRANE MODULE

(71) Applicant: Ube Industries, Ltd., Ube-shi (JP)

(72) Inventors: Shoichi Yamaoka, Ube (JP); Tomoyuki Suehiro, Ube (JP); Tomohide Nakamura, Tokyo (JP); Nozomu Tanihara, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 0 days.

(21) Appl. No.: 14/420,519

(22) PCT Filed: Aug. 8, 2013

(86) PCT No.: PCT/JP2013/071488
§ 371 (c)(1),
(2) Date: Feb. 9, 2015

(87) PCT Pub. No.: WO2014/024961
PCT Pub. Date: Feb. 13, 2014

(65) Prior Publication Data
US 2015/0217235 A1 Aug. 6, 2015

(30) Foreign Application Priority Data

Aug. 10, 2012 (JP) .................................. 2012-177951
Sep. 21, 2012 (JP) .................................. 2012-208826

(51) Int. Cl.
*B01D 53/22* (2006.01)
*B01D 63/02* (2006.01)

(52) U.S. Cl.
CPC .............. *B01D 63/02* (2013.01); *B01D 53/22* (2013.01); *B01D 63/022* (2013.01); *B01D 2313/23* (2013.01); *B01D 2315/10* (2013.01); *B01D 2319/04* (2013.01); *Y02C 10/10* (2013.01)

(58) Field of Classification Search
CPC .... B01D 53/22; B01D 63/02; B01D 63/022; B01D 63/027; B01D 2313/23; B01D 2315/10; B01D 2319/04; Y02C 10/10
See application file for complete search history.

(56) References Cited

U.S. PATENT DOCUMENTS 3,339,341 A * 9/1967 Murdock ............... B01D 63/02
                                                                                  95/53
3,342,729 A * 9/1967 Strand .................... B01D 53/22
                                                                                 127/54

(Continued)

FOREIGN PATENT DOCUMENTS

JP         S631404         1/1988
JP         63-267415      11/1988

(Continued)

OTHER PUBLICATIONS

"cloth" American Heritage Dictionary of the English Language, Fifth Edition. 2011 by Houghton Mifflin Harcourt Publishing Company 1 pg <thefreedictionary.com/cloth>.*

(Continued)

*Primary Examiner* — Anthony Shumate
(74) *Attorney, Agent, or Firm* — Knobbe Martens Olson & Bear LLP

(57) ABSTRACT

A gas separation membrane module in which deformation of a tube sheet such as swelling and shrinkage can be prevented in gas separation. The gas separation membrane module includes a hollow fiber bundle provided by bundling multiple hollow fiber membranes, a module vessel in which the hollow fiber bundle is placed, and a tube sheet fixing the plurality of hollow fiber membranes at an end portion of hollow fiber bundle. The cross section of the tube sheet includes a hollow fiber membrane embedded portion in which the hollow fiber membranes are embedded and a solid portion in which no hollow fiber membrane is embedded, and the solid portion is located outside the hollow fiber membrane embedded portion. At least some of the hollow fiber membranes are wound with reinforcing fiber cloth at least within the hollow fiber membrane embedded portion.

8 Claims, 9 Drawing Sheets

(56) References Cited

U.S. PATENT DOCUMENTS

| | | | |
|---|---|---|---|
| 3,422,008 A | 1/1969 | McLain | |
| 3,442,002 A * | 5/1969 | Geary, Jr. | B01D 63/02 210/321.89 |
| 3,801,401 A | 4/1974 | Cope et al. | |
| 3,832,830 A * | 9/1974 | Gerow | B01D 53/22 96/8 |
| 3,896,015 A * | 7/1975 | McRae | B01D 53/326 204/522 |
| 4,230,463 A * | 10/1980 | Henis | B01D 53/22 210/500.23 |
| 4,308,654 A * | 1/1982 | Bogart | B01D 53/22 210/321.89 |
| 4,421,529 A * | 12/1983 | Revak | B01D 53/22 95/54 |
| 4,758,341 A * | 7/1988 | Banner | B01D 53/22 210/232 |
| 4,781,834 A * | 11/1988 | Sekino | B01D 53/22 210/321.88 |
| 4,917,798 A | 4/1990 | Liou et al. | |
| 4,929,259 A * | 5/1990 | Caskey | B01D 53/22 210/321.81 |
| 4,940,617 A | 7/1990 | Baurmeister | |
| 4,961,760 A * | 10/1990 | Caskey | B01D 53/22 210/321.81 |
| 4,978,430 A | 12/1990 | Nakagawa et al. | |
| 5,059,374 A * | 10/1991 | Krueger | B01D 53/22 210/321.61 |
| 5,282,964 A * | 2/1994 | Young | B01D 53/22 210/321.8 |
| 5,380,433 A * | 1/1995 | Etienne | B01D 53/22 156/294 |
| 5,598,874 A * | 2/1997 | Alei | B01D 63/021 139/1 R |
| 5,693,230 A * | 12/1997 | Asher | B01D 53/22 210/263 |
| 5,695,702 A * | 12/1997 | Niermeyer | B01D 63/02 156/187 |
| 5,702,601 A * | 12/1997 | Bikson | B01D 63/021 210/321.74 |
| 5,837,033 A * | 11/1998 | Giglia | B01D 53/22 210/321.78 |
| 6,071,414 A * | 6/2000 | Kishi | B01D 61/02 210/321.78 |
| 6,183,639 B1 * | 2/2001 | de Winter | B01D 63/02 210/321.79 |
| 6,258,267 B1 * | 7/2001 | Ota | B01D 33/067 210/167.02 |
| 6,270,674 B1 * | 8/2001 | Baurmeister | B01D 15/08 210/321.79 |
| 6,558,549 B2 * | 5/2003 | Cote | B01D 53/22 210/605 |
| 6,616,841 B2 * | 9/2003 | Cho | B01D 19/0031 210/321.74 |
| 7,682,422 B2 * | 3/2010 | Tanihara | B01D 53/22 210/321.74 |
| 7,771,518 B2 * | 8/2010 | Yoshinaga | B01D 53/228 210/500.27 |
| 8,182,592 B2 * | 5/2012 | Nakamura | B01D 53/22 210/321.88 |
| 8,449,659 B2 * | 5/2013 | Taylor | B01D 19/0031 95/46 |
| 8,506,807 B2 * | 8/2013 | Lee | B01D 63/10 210/321.74 |
| 2002/0022146 A1 * | 2/2002 | Keefer | B01D 53/02 428/630 |
| 2004/0076874 A1 | 4/2004 | Nickel et al. | |
| 2004/0188339 A1 | 9/2004 | Murkute et al. | |
| 2008/0251954 A1 * | 10/2008 | Casper | B01F 3/0412 261/122.1 |
| 2010/0065485 A1 | 3/2010 | Chen et al. | |
| 2011/0062076 A1 * | 3/2011 | Lee | B01D 63/10 210/437 |
| 2012/0031831 A1 | 2/2012 | Kanougi et al. | |
| 2012/0304856 A1 | 12/2012 | Kanetsuki et al. | |
| 2013/0105391 A1 * | 5/2013 | Friese | C02F 3/102 210/615 |
| 2015/0174533 A1 * | 6/2015 | Li | B01D 53/22 95/45 |

FOREIGN PATENT DOCUMENTS

| | | |
|---|---|---|
| JP | 5-85423 | 11/1993 |
| JP | A-H06-226057 | 8/1994 |
| JP | A-H07-308549 | 11/1995 |
| JP | Y-2572411 | 3/1998 |
| JP | 2001-137669 | 5/2001 |
| JP | A-2002-292213 | 10/2002 |
| JP | A-2005-169179 | 6/2005 |
| JP | A-2006-082035 | 3/2006 |
| JP | 2010-527289 | 8/2010 |
| JP | 2012-045453 | 3/2012 |
| JP | 2012-110878 | 6/2012 |
| WO | WO 2010/114010 A1 | 10/2010 |
| WO | WO 2011/105495 | 9/2011 |

OTHER PUBLICATIONS

First Office Action in Chinese Patent Application No. 201380052072.4, dated Nov. 23, 2015, 15 pgs.

Partial Supplementary European Search Report in International Patent Application No. PCT/JP2013/071488, dated Apr. 5, 2016, 7 pgs.

Office Action in Japanese Patent Application No. 2012-208826, dated Jun. 7, 2016 10 pages.

Office Action in Japanese Patent Application No. 2012-177951, dated Aug. 2, 2016 9 pgs.

Extended European Search Report in European Patent Application No. 13827746.2, dated Aug. 19, 2016.

* cited by examiner

Fig.1
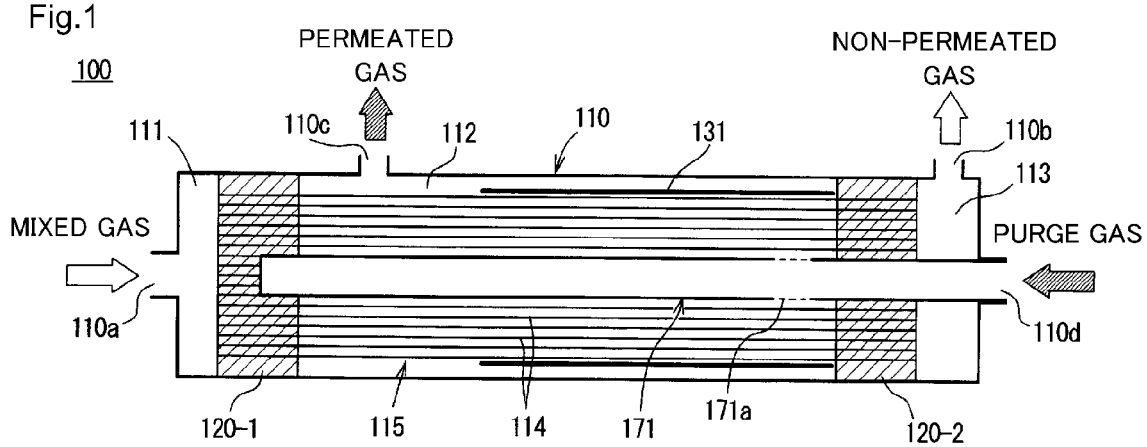
Fig.2
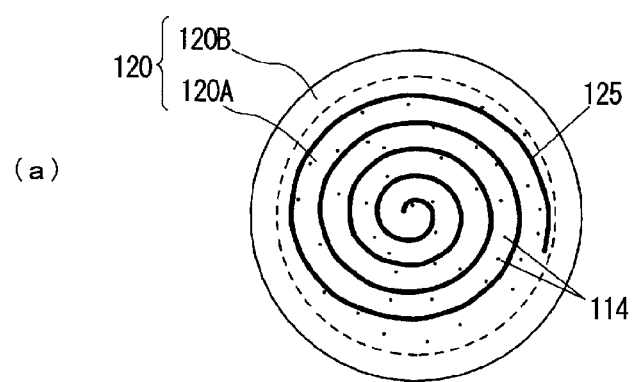
(a)
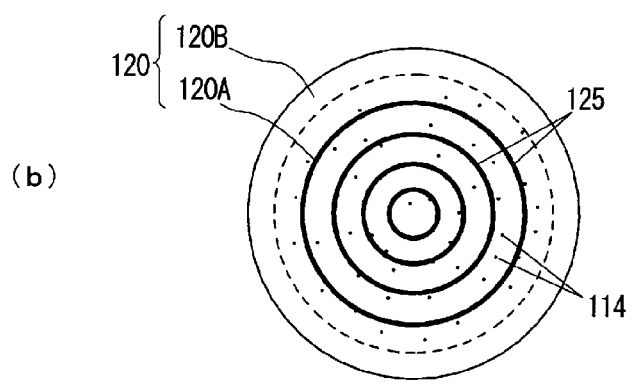
(b)

Fig.5
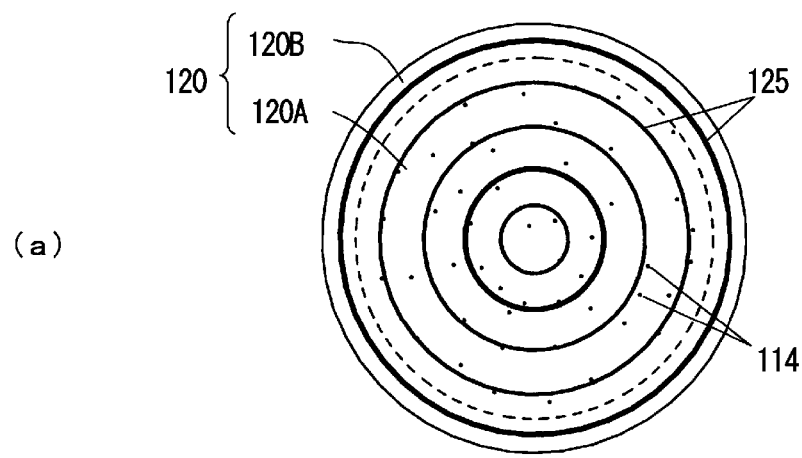
(a)
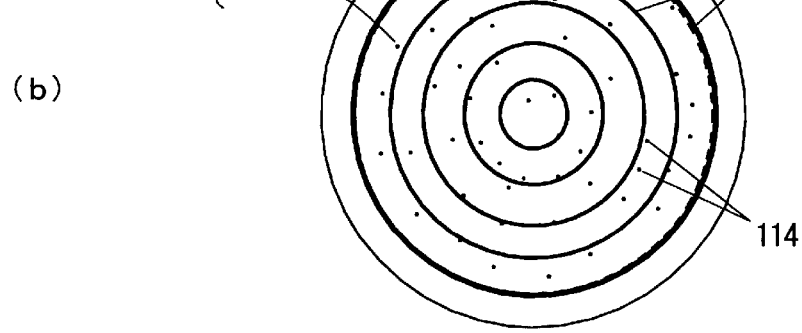
(b)
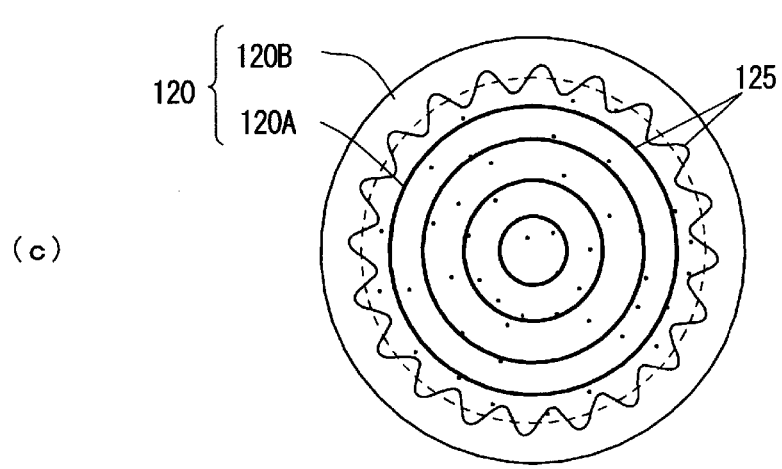
(c)

GAS-SEPARATING MEMBRANE MODULE

This application is the U.S. National Phase under 35 U.S.C. §371 of International Application No. PCT/JP2013/071488, filed Aug. 8, 2013, designating the U.S., and published in Japanese as WO 2014/024961 on Feb. 13, 2014, which claims priority to Japanese Patent Application No. 2012-177951, filed Aug. 10, 2012; and Japanese Patent Application No. 2012-208826, filed Sep. 21, 2012, the entire contents of which are incorporated herein by reference.

TECHNICAL FIELD

The present invention relates to a gas separation membrane module which achieves gas separation using hollow fiber membranes, more particularly to a gas separation membrane module in which deformation of a tube sheet such as swelling and shrinkage can be prevented in gas separation.

BACKGROUND ART

Conventionally, separation membrane modules such as a plate and frame type, a tubular type, a hollow fiber membrane type and the like for achieving gas separation (for example, oxygen separation, nitrogen separation, hydrogen separation, water vapor separation, carbon dioxide separation, and organic vapor separation) using separation membranes with permselectivity are known. Among them, gas separation membrane module of the hollow fiber membrane type is industrially beneficial and widely used due to not only the advantage of the largest membrane area per unit volume but also to high resistance to pressure and excellent self-support.

The gas separation membrane module of the hollow fiber membrane type typically includes a hollow fiber bundle consisting of a plurality of hollow fiber membranes with permselectivity and a tubular vessel for housing the bundle and is configured such that the hollow fiber bundle is fixed at one end or both ends to a hardened sheet (tube sheet) made of resin.

Patent Document 1 describes a method for organic vapor separation using a gas separation membrane module, the method including heating and vaporizing an aqueous solution containing an organic compound to provide an organic vapor mixture containing the vapor of the organic compound (organic vapor) and water vapor, then passing the organic vapor mixture through separation membranes at a temperature of, for example, 70° C. or higher, and allowing the water vapor to selectively permeate and separate, thereby obtaining the organic compound with high purity.

PRIOR ART REFERENCE

Patent Document 1: JP-A-S63 (1988)-267415

DISCLOSURE OF THE INVENTION

Problems to be Solved by the Invention

In organic vapor separation as described above, tube sheet may deform significantly in a manner of swelling or shrinkage to compromise seal of the gas separation membrane module for preventing favorable gas separation from being continued. This problem may occur not only in organic vapor separation but also in other type of gas separation which may involve the deformation of the tube sheet. For example, when the tube sheet absorbs hydrocarbons, carbon dioxide, or water, the tube sheet may be deformed due to plasticization or swelling.

The present invention has been made in view of such problems, and it is an object thereof to provide a gas separation membrane module in which deformation of a tube sheet such as swelling and shrinkage can be prevented in gas separation.

Means for Solving the Problems

To accomplish the object, according to an aspect, the present invention provides:
1. A gas separation membrane module including:
  a hollow fiber bundle provided by bundling a plurality of hollow fiber membranes with permselectivity;
  a module vessel in which the hollow fiber bundle is placed; and
  a tube sheet fixing the plurality of hollow fiber membranes at an end portion of the hollow fiber bundle,
  wherein a cross section (referring to a cross section along a direction perpendicular to a thickness direction of the tube sheet) of the tube sheet includes a hollow fiber membrane embedded portion in which the hollow fiber membranes are embedded and a solid portion in which no hollow fiber membrane is embedded, the solid portion located outside the hollow fiber membrane embedded portion, and
  at least some of the plurality of hollow fiber membranes are wound with a reinforcing fiber cloth at least within the hollow fiber membrane embedded portion.
2. The gas separation membrane module according to 1, wherein the reinforcing fiber cloth is an inorganic fibrous woven cloth.
3. The gas separation membrane module according to 2, wherein the reinforcing fiber cloth is a glass fiber cloth.
4. The gas separation membrane module according to any one of 1 to 3, wherein the reinforcing fiber cloth is placed in spiral shape (when viewed on the cross section along the direction perpendicular to the thickness direction of the tube sheet).
5. The gas separation membrane module according to any one of 1 to 3, wherein the reinforcing fiber cloth is placed in (a single or a plurality of) circular shape.
6. The gas separation membrane module according to any one of 1 to 5, wherein the tube sheets are disposed at both end portions of the hollow fiber bundle, and at least some of the plurality of hollow fiber membranes are wound with the reinforcing fiber cloth within each of the tube sheets.
7. The gas separation membrane module according to any one of 1 to 6, wherein the hollow fiber membrane is a gas separation membrane for organic vapor separation.
8. The gas separation membrane module according to any one of 1 to 7, further including a core pipe being a hollow member for feeding a purge gas into the module and placed substantially at the center of the hollow fiber bundle.

Advantage of the Invention

According to the present invention, the gas separation membrane module can be provided in which the deformation of the tube sheet such as swelling and shrinkage can be prevented in gas separation.

BRIEF DESCRIPTION OF THE DRAWINGS

FIG. 1 is a section view schematically showing the configuration of a gas separation membrane module according to an embodiment of the present invention in Section I.

FIG. 2 is section views showing exemplary arrangements of a reinforcing fiber cloth within a tube sheet, wherein FIG. 2(a) shows the reinforcing fiber cloth wound in spiral shape and FIG. 2(b) shows the reinforcing fiber cloth wound in circular shape.

FIG. 5 is section views showing still other exemplary arrangements of the reinforcing fiber cloth within the tube sheet.

EMBODIMENT OF THE INVENTION

Figure 3:
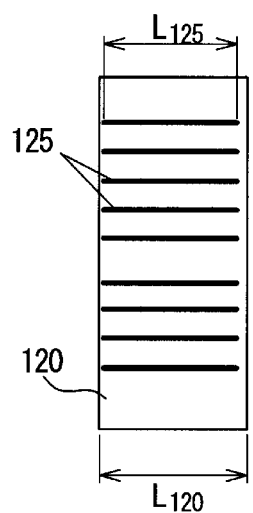
FIG. 3 is a section view schematically showing the tube sheet in a thickness direction.

Preferred embodiments of a gas separation membrane module according to the present invention will hereinafter be described in Sections I and II. The background art, problems and the like associated with the present invention disclosed in Section II are described later in Section II. As required, some technical matters described in one of sections may be combined with some technical matters described in the other section as appropriate.

[Section I: Gas Separation Membrane Module in which Deformation of Tube Sheet can be Prevented]

An embodiment of the present invention will hereinafter be described with reference to the accompanying drawings. Although the following description is made of the module of a type in which a purge gas is flowed, the present invention is not limited thereto. In addition, although the following description is focused on an example of organic vapor separation, it goes without saying that the present invention is applicable to a gas separation membrane module for other types of gas separation.

[Configuration of Gas Separation Membrane Module]

A gas separation membrane module (hereinafter simply referred to as module) 100 shown in FIG. 1 includes a hollow fiber bundle 115 consisting of a plurality of hollow fiber membranes 114, a module vessel 110 housing hollow fiber bundle 115, and tube sheets 120-1 and 120-2 (hereinafter collectively referred to as tube sheet 120 in some cases) provided at both end portions of hollow fiber bundle 115. By way of example, gas separation membrane module 100 is of a bore feed type in which mixed gas is fed into hollow fiber membranes 114.

The hollow fiber membrane 114 can be provided by using a conventionally known membrane with permselectivity. Hollow fiber membrane may have a homogeneous structure or a heterogeneous structure such as of a composite membrane and an asymmetric membrane. For gas separation, asymmetric membrane made of aromatic polyimide is appropriate due to high selectivity and high gas permeance, for example. The membrane having a thickness of 20 to 200 µm and an outer diameter of 50 to 1000 µm can be preferably used. An example of the material of hollow fiber membrane 114 can be polymer material, and particularly polyimide, polysulfone, polyetherimide, polyphenyleneoxide, or polycarbonate.

The term "organic vapor separation" used herein means a method comprising; feeding a gas separation membrane module with a mixed gas (organic vapor mixture) in a vapor state provided by heating a liquid mixture containing an organic compound in a liquid state at room temperature; separating the organic vapor mixture into permeated vapor which has permeated the hollow fiber membranes and non-permeated vapor which has not permeated the hollow fiber membranes during the flow of the organic vapor mixture in contact with hollow fiber membranes; and collecting the permeated vapor through a permeated gas discharge port and the non-permeated vapor through a non-permeated gas discharge port. Since the hollow fiber membrane has permselectivity, the permeated vapor is rich in a component (hereinafter referred to as a highly permeated component in some cases) permeating the hollow fiber membranes at a high rate, whereas the non-permeated vapor is less rich in the highly permeated component. Thus, the organic vapor mixture is separated into permeated vapor rich in the highly permeated component and non-permeated vapor less rich in the highly permeated component.

An example of the organic vapor separation is dehydration of ethanol containing water by using the hollow fiber membranes made of polyimide. Since water vapor permeates the hollow fiber membranes made of polyimide at a higher rate, the water vapor serves as the highly permeated component. The ethanol is separated into permeated vapor mainly containing the water vapor and non-permeated vapor mainly containing the ethanol vapor, and then they are collected. As a result, the dehydrated ethanol is obtained.

Hollow fiber bundle 115 may be provided by bundling approximately 100 to 1,000,000 hollow fiber membranes 114, for example. The shape of hollow fiber bundle 115 is not particularly limited, but a cylindrical shape is preferable, by way of example, in terms of ease of manufacture and resistance to pressure of the module vessel. Although FIG. 1 shows the arrangement in which the hollow fiber membranes are aligned substantially in parallel, another arrangement may be used in which hollow fiber membranes are crossed.

Hollow fiber bundle 115 is partially covered with a film member 131 for regulating flow of purge gas (described later in detail) such that the purge gas flows in oppose direction with a feed direction of the mixed gas. The film member 131 is made of a material without gas permeability. Hollow fiber bundle 115 is not covered with film member 131 in the vicinity of permeated gas outlet 110c, thus the hollow fiber membranes 114 are opened.

Module vessel 110 has a substantially tubular shape, and in this example, has a mixed gas inlet 110a formed at one end face and a purge gas inlet 110d formed at the other end face for introducing the purge gas. It is noted that the term "tubular shape" used herein is not limited to a cylindrical shape but refers to a hollow member of rectangular shape, polygonal shape, oval shape and the like in cross section.

Module vessel 110 may include a tubular member and cap members attached to both end portions thereof, for example.

Inner space of the module vessel 110 is divided by two tube sheets 120-1 and 120-2 into three spaces 111, 112, and 113. Space 111 is formed upstream of tube sheet 120-1, and the mixed gas flows into the space 111 through mixed gas inlet 110a. Space 112 is formed between tube sheets 120-1 and 120-2, and the permeated gas which has permeated hollow fiber membranes 114 or the like flows into the space 112. Space 113 is formed downstream of tube sheet 120-2, and the non-permeated gas flows into the space 113.

To let out permeated gas which has flowed into the space 112, permeated gas outlet 110c is formed on a peripheral wall portion of module vessel 110. To let out non-permeated gas fed into the space 113, non-permeated gas outlet 110b is also formed on the peripheral wall portion of module vessel 110.

A core pipe 171 is disposed along the center of hollow fiber bundle 115. The core pipe 171 is a member closed at one end and opened at the other end, and is oriented with the opening portion located downstream (closer to tube sheet 120-2). The core pipe 171 extends through tube sheet 120-2, and the end portion of core pipe 171 is embedded in upstream tube sheet 120-1. Core pipe 171 has holes 171a at a position between two tube sheets 120-1 and 120-2. The purge gas is fed through the opening portion (purge gas inlet 110d) of core pipe 171. The gas is then delivered into space 112 via hole 171a to promote the discharge of the permeated gas.

Tube sheet 120 can be made of conventionally known material, and examples thereof include a thermoplastic resin such as polyethylene and polypropylene; and a thermosetting resin such as epoxy resin and urethane resin. Tube sheet 120 serves as a member for fixing (securing) hollow fiber membranes 114. Outer peripheral face of the tube sheet 120 may be adhered to inner peripheral face of the module vessel.

As shown in FIG. 2(*a*) and FIG. 2(*b*), tube sheet 120 includes a hollow fiber membrane embedded portion 120A where hollow fiber membranes 114 exist and a solid portion 120B located outside where hollow fiber membranes 114 do not exist. The hollow fiber embedded portion 120A is configured such that resin fills the space between hollow fiber membranes 114, whereas the solid portion 120B is essentially formed only of the resin.

As shown in FIG. 2(*a*) and FIG. 2(*b*), in the present embodiment, reinforcing fiber cloth 125 is placed at least in hollow fiber embedded portion 120A of one or both of tube sheets 120. The reinforcing fiber cloth 125 may be wound in spiral shape as shown in FIG. 2(*a*), or may be wound in ring-shaped cross section as shown in FIG. 2(*b*). It is also preferred that reinforcing fiber cloth 125 is extended longer so that its end can reach the solid portion 120B.

Although FIG. 2 shows the reinforcing fiber cloth 125 in a smooth curve, the present invention is not limited thereto, and the reinforcing fiber cloth 125 may be wound in substantially spiral or circular shape with small waves in cross section (concave and convex shape in a radial direction). When disposing reinforcing fiber cloths 125 in circular shape as shown in FIG. 2(*b*), a plurality of reinforcing fiber cloths 125 may be placed substantially concentrically. Although core pipe 171 is not shown in FIG. 2(*a*), reinforcing fiber cloth 125 may be wound in spiral shape starting from the core pipe 171 or near core pipe 171.

Other arrangement of reinforcing fiber cloth 125 is described later with reference to other drawings.

Material for the reinforcing fiber cloth 125 may be a material such as fiber glass cloth such as glass fiber cloth; metal fiber cloth such as metal mesh screen; carbon fiber; alumina fiber; aramid fiber; boron fiber; and zylon fiber. Material having a thermal expansion coefficient lower than that of the material of the tube sheet is preferably used. Reinforcing fiber cloth 125 may be a fiber cloth such as woven cloth type and nonwoven cloth type.

Although it depends on a type of the fiber used, a weaving density, or a degree of fiber spreading, thickness of the reinforcing fiber cloth 125 may be 10 µm to 2000 µm, for example. If reinforcing fiber cloth 125 has a thickness smaller than 10 µm, sufficient reinforcing effect may not be provided. On the other hand, if reinforcing fiber cloth 125 has a thickness larger than 2000 µm, an area of reinforcing fiber cloth 125 occupying the cross-sectional area of tube sheet 120 is increased, which may cause filling amount of the hollow fiber membranes to be reduced.

Depending on a type of the fiber used, weaving density, or degree of fiber spreading, reinforcing fiber cloth 125 may have a basis weight of 10 g/m$^2$ to 1500 g/m$^2$, for example. Reinforcing fiber cloth 125 has a tensile strength of 10 MPa or higher, for example. Lower limit of tensile modulus of elasticity of the reinforcing fiber cloth 125 may preferably be 1 GPa, and more preferably 5 GPa. Upper limit may preferably be 500 GPa, and more preferably 200 GPa. If the tensile modulus of elasticity is too low, sufficient reinforcing effect may not be provided.

An example of reinforcing fiber cloth 125 in the present embodiment is glass fiber cloth (manufactured by Tokyo Glass Kikai (TGK), with thickness of 250 µm, basis weight of 211 g/m$^2$, tensile strength of 131 MPa, and tensile modulus of elasticity of 6.3 GPa).

Reinforcing fiber cloth 125 may be wound after impregnation with a thermosetting resin such as epoxy resin. Reinforcing fiber cloth 125 may have width dimension $L_{125}$ (dimension in a thickness direction of the tube sheet, see FIG. 3) approximately equal to thickness $L_{120}$ of tube sheet 120, or equal to approximately 50% to 90% of thickness $L_{120}$.

[How to Use Gas Separation Membrane Module]

Gas separation membrane module 100 of the present embodiment configured as above is used in the following manner. The use illustrated below does not limit the present invention in any way.

In organic vapor separation as an example, an organic vapor mixture containing organic vapor and water vapor is first heated to a temperature of 70° C. or higher for example, and then is fed into space 111 of the module through a mixed gas inlet 110a. Pressure for feeding the gas is 0.1 to 0.3 MPaG, for example.

The organic vapor mixture is then fed into hollow fiber membranes 114, and while flowing through hollow fiber membranes 114, part of the organic vapor mixture permeates to the outside of hollow fiber membranes 114. Permeated gas which has permeated hollow fiber membranes 114 is let out to space 112, and is discharged to the outside through permeated gas discharge port 110c by feeding purge gas through core pipe 171. On the other hand, non-permeated gas which has not permeated hollow fiber membranes 114 flows downstream inside hollow fiber membranes 114, is the directed to the outside of the membranes through the downstream opening end, to be fed into space 113. Then, non-permeated gas is discharged to the outside through non-permeated gas outlet 110b. Since hollow fiber membrane 114 has the permselectivity, permeated gas which has permeated the membranes is rich in water vapor serving as the highly permeated component. In contrast, in non-permeated gas discharged through the non-permeated gas discharge port, concentration of water vapor serving as highly permeated component has been reduced.

In carbon dioxide separation as an example, natural gas with a pressure of 4 to 8 MPaG and a temperature of 40 to 70° C. is processed by using hollow fiber membranes made of polyimide. Since rate which carbon dioxide permeates the hollow fiber membranes made of polyimide is higher than that of a hydrocarbon such as methane, the natural gas can be separated into a permeated gas rich in carbon dioxide and a non-permeated gas rich in hydrocarbon such as methane, and then they are collected.

[Example of Manufacture Method]

The gas separation membrane module of the present embodiment can basically be manufactured with steps similar to conventional ones except a step of winding the reinforcing fiber cloth.

To wind a reinforcing fiber cloth 125 in spiral shape as shown in FIG. 2(a), reinforcing fiber cloth 125 is continuously wound, as hollow fiber membranes 114 are placed little by little around core pipe 171, for example.

To wind reinforcing fiber cloth 125 in circular shape as shown in FIG. 2(b), a certain amount of hollow fiber membrane 114 is bundled around the core pipe, and then a reinforcing fiber cloth 125 is wound around them, for example. To form a plurality of reinforcing fiber cloths in concentric shape, those steps may be repeated. To form circular shape, end portions of reinforcing fiber cloth 125 may be bonded to each other by an adhesive or the like. Alternatively, when reinforcing fiber cloth 125 is impregnated with epoxy resin or the like, the end portions may be bonded to each other temporarily by a self-adhesive tape or the like, and after the resin is cured, the self-adhesive tape may be peeled off. To form circular shape, the end portions of reinforcing fiber cloth 125 may be seamed together with a fiber or the like similar to the reinforcing fiber cloth. Alternatively, a fiber or the like similar to the reinforcing fiber cloth may be wound and tied around the reinforcing fiber cloth.

Conventional steps for forming tube sheet 120 include a step of cutting part of the tube sheet after curing to open the hollow fiber membranes. During this step, part of reinforcing fiber cloth 125 in the tube sheet may be cut together with the tube sheet.

According to gas separation membrane module 100 in the present embodiment configured as above, since reinforcing fiber cloth 125 is wound within tube sheet 120, deformation of the tube sheet such as swelling and shrinkage can be prevented during organic vapor separation, to avoid compromise of seal of the gas separation membrane module, thereby achieving excellent gas separation.

In a conventional gas separation membrane module which does not include such a reinforcing fiber cloth within the tube sheet, a tube sheet may be swollen and deformed into convex shape in an axis direction (thickness direction) during organic vapor separation.

In contrast, according to the configuration of the present embodiment, since the reinforcing fiber cloth 125 is wound within tube sheet 120, deformation such as swelling and shrinkage can be prevented. As a result, the gas separation can be performed favorably according to gas separation membrane module 100 of the present embodiment.

The function and effect of the wound reinforcing fiber cloth as described above can also be provided not only for the tube sheet made of epoxy but also for a tube sheet made of a different material such as urethane. In other words, a tube sheet is not necessarily limited to one made of a particular material in the present invention.

Other Embodiments

The present invention is not limited to the above embodiment, and various modifications are possible.

Figure 4:
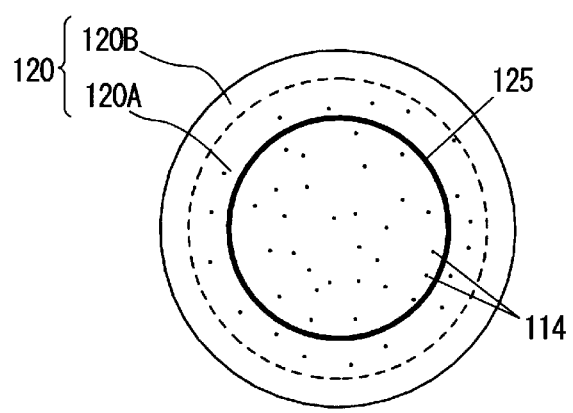
FIG. 4 is a section view showing another exemplary arrangement of the reinforcing fiber cloth within the tube sheet.

As shown in FIG. 4, reinforcing fiber cloth 125 may be wound to form a single circle in hollow fiber embedded portion 120A of tube sheet 120. In this case, reinforcing fiber cloth 125 may be wound only one turn or plurality of turns on a plurality of hollow fiber membranes.

As shown in FIG. 5(a), reinforcing fiber cloth 125 may be placed not only in hollow fiber embedded portion 120A but also in solid portion 120B. As shown in FIG. 5(b) and FIG. 5(c), reinforcing fiber cloth 125 may be placed on a boundary portion between hollow fiber embedded portion 120A and solid portion 120B. Reinforcing fiber cloth 125 may be wavy in cross section as shown in FIG. 5(c), and the waves may be regularly or irregularly formed.

Figure 6:
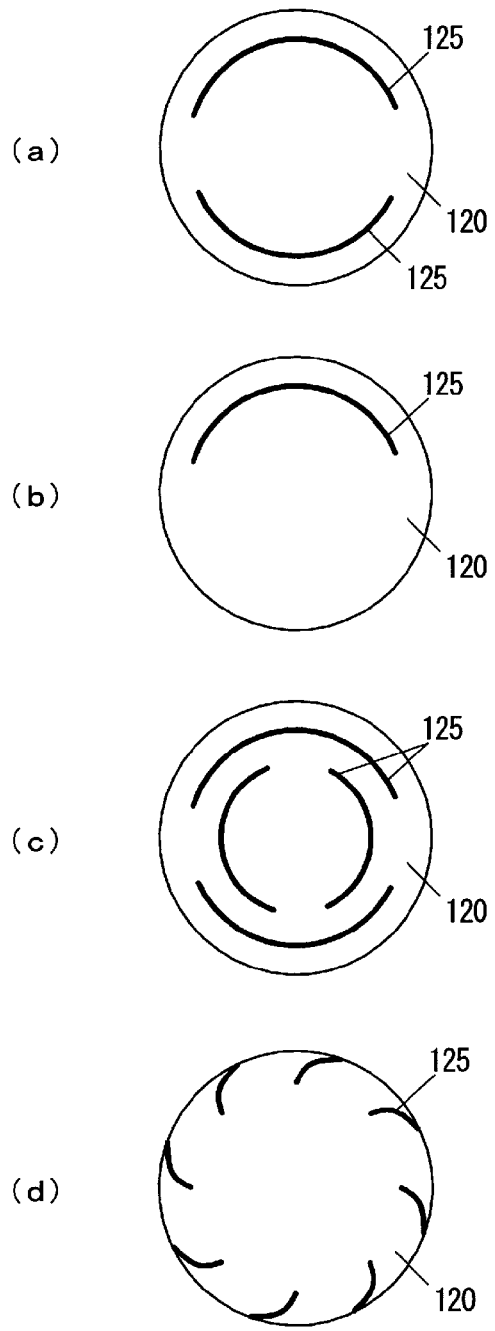
FIG. 6 is section views illustrating some winding methods of the reinforcing fiber cloth.

The term "reinforcing fiber cloth is wound at least on a plurality of hollow fiber membranes" used herein does not necessarily mean that reinforcing fiber cloth 125 is wound in a circumferential direction over 360 degrees or more. As illustrated from FIG. 6(a) to FIG. 6(d), reinforcing fiber cloth may be placed as a single or a plurality of arcs, or as only part of a spiral. In FIG. 6(a), two reinforcing fiber cloths 125 in arc shape are placed within tube sheet 120. In FIG. 6(b), one reinforcing fiber cloth 125 in arc shape is disposed. In FIG. 6(c), two reinforcing fiber cloths 125 in arc shape are disposed on each of plurality of circles with different radii. In FIG. 6(d), a plurality of reinforcing fiber cloths 125 in spiral shape extending from certain inside positions to the outer peripheral face of the tube sheet are placed along the circumferential direction.

Figure 7:
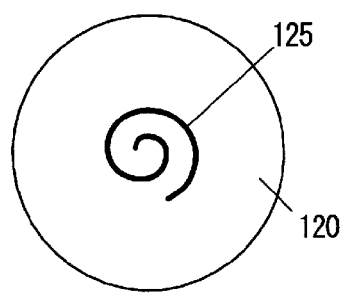
FIG. 7 is a section view showing another example of the reinforcing fiber cloth wound in spiral shape.

As shown in FIG. 7, reinforcing fiber cloth 125 may be placed to form only part of a spiral. In FIG. 7, reinforcing fiber cloth 125 is placed only near the center of tube sheet 120.

[Section II: Hollow Fiber Element Having Excellent Handleability and Involving Less Damage During Replacement and Separation Membrane Module Including the Same]

TECHNICAL FIELD

The present invention in Section II relates to a replaceable hollow fiber element and a separation membrane module including the same, and more particularly, to a hollow fiber element having excellent handleability and involving less damage during replacement, and to a separation membrane module including the same.

BACKGROUND ART

Patent Document 2 (Japanese Patent Laid-Open No. 2010-82496) discloses a hollow fiber element configured to feed a purge gas through a core pipe placed substantially at the center of a hollow fiber bundle, in which the flow of the purge gas is regulated by a film wound around the outer peripheral portion of the hollow fiber bundle.

Problems to be Solved by the Present Invention in Section II

In the gas separation membrane module, the hollow fiber element is often replaceable. When the hollow fiber element is the above-mentioned one having the film wound around the outer peripheral portion of the hollow fiber bundle, the film may come into contact with, for example, part of a vessel to suffer damage during the attachment/detachment of the hollow fiber element. For this reason, replacement of the hollow fiber element may require on-site instruction from a skilled operator.

To address this, the present invention in Section II relates to a separation membrane module including a replaceable hollow fiber element, and it is an object thereof to provide a hollow fiber element having excellent handleability and involving less damage during replacement and a separation membrane module including the same.

Means for Solving the Problems

In Section II, the following invention is disclosed.
1. A hollow fiber element, including:
   a hollow fiber bundle provided by bundling a plurality of hollow fiber membranes with permselectivity;
   a tube sheet disposed at least at an end portion of the hollow fiber membranes and fixing the hollow fiber membranes;
   a core pipe placed substantially at the center of the hollow fiber bundle and configured to feed a purge gas to an external space of the hollow fiber membranes; and
   an element case housing the hollow fiber bundle and the tube sheet,
   the hollow fiber element being of a bore feed type in which a mixed gas is introduced into the hollow fiber membranes,
   wherein the element case includes:
   a tubular member having an opening portion formed on an outer peripheral portion for discharging gas, surrounding the hollow fiber bundle, the tubular member configured to define flows of gases so that mixed gas within the hollow fiber membranes is a countercurrent flow against the purge gas outside the hollow fiber membranes; and
   an end portion member attached to one end or both ends of the tubular member.
2. The hollow fiber element described above, wherein the tubular member includes:
   a first pipe surrounding part of the hollow fiber bundle in a longitudinal direction; and
   a second pipe, connected to an end portion of the first pipe, said pipe substantially surrounding the remaining portion of the hollow fiber bundle.
3. The hollow fiber element described above, wherein the second pipe includes two or more members partially (referring to a portion in a circumferential direction) covering an outer peripheral portion of the hollow fiber bundle.
4. The hollow fiber element described above, wherein the end portion member is a tube sheet ring in ring shape surrounding an outer peripheral portion of the tube sheet, and
   an annular seal member is placed between the tube sheet and the tube sheet ring.
5. The hollow fiber element described above, wherein the end portion member has an annular groove, formed on its outer peripheral portion, in which an annular seal member is disposed.
6. A hollow fiber element including:
   a hollow fiber bundle provided by bundling a plurality of hollow fiber membranes with permselectivity;
   a tube sheet disposed at least at an end portion of the hollow fiber membranes and fixing the hollow fiber membranes; and an element case housing the hollow fiber bundle and the tube sheet,
   wherein the element case includes:
   a tubular member including a first pipe surrounding part of the hollow fiber bundle in a longitudinal direction and a second pipe connected to an end portion of the first pipe and substantially surrounding the remaining portion of the hollow fiber bundle; and
   an end portion member attached to one end or both ends of the tubular member.
7. A gas separation membrane module including:
   the hollow fiber element according to any one of the above; and
   a module vessel into which the hollow fiber element is removably mounted.
8. The gas separation membrane module described above, wherein the module vessel includes a module pipe providing a substantially cylindrical internal space in which the hollow fiber element is placed, and the internal space has a diameter formed to be substantially constant.

DESCRIPTION OF TERMS

The term "tubular shape" is not limited to a cylindrical shape but includes a rectangular shape, a polygonal shape, an oval shape and the like in cross section.

The term "substantially constant" includes not only being constant but also being substantially constant. For example, the term "the diameter of internal space is substantially constant" includes both a case where the diameter is constant over the entire internal space and a case where the diameter is not strictly constant over the entire internal space due to concave or convex formed in part of the space but is substantially constant.

The term "countercurrent flow" refers to a flow in a direction substantially opposite to a direction of a flow from a mixed gas feed side along the axis line of a core pipe. One of the flows is not necessarily 180-degree opposite to the other flow, but the countercurrent flow includes two flows crossed and opposed to each other in a range of approximately plus or minus 30 degrees.

Embodiment of the Invention in Section II

An embodiment of the present invention in Section II will be described with reference to the drawings. Although the following description is made of the configuration of a so-called bore feed type and including the flow of a purge gas, the present invention in Section II is not limited thereto.
[Configurations of Gas Separation Membrane Module and Hollow Fiber Element]

Figure 8:
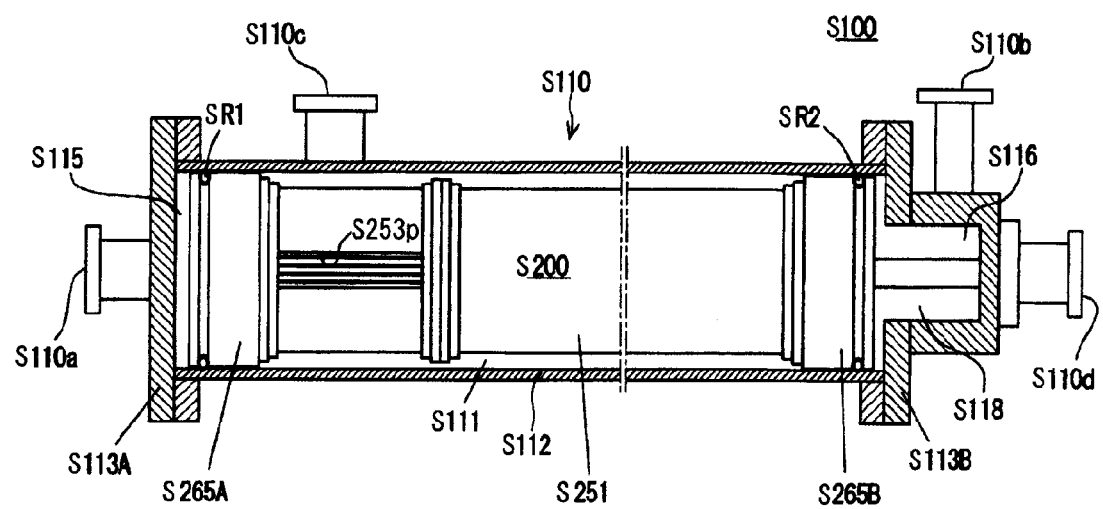
FIG. 8 is a section view of a gas separation membrane module according to an embodiment of the present invention in Section II (showing an inside hollow fiber element in a side view instead of a section view).
Figure 9:
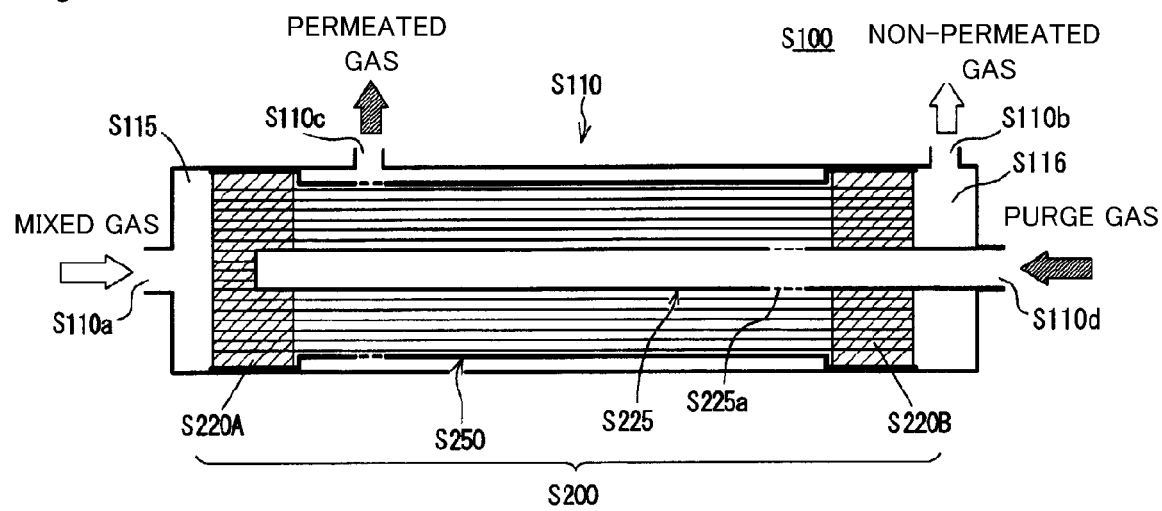
FIG. 9 is a schematic section view for explaining the configuration of the module shown in FIG. 8.

As shown in FIG. 8 and FIG. 9, a gas separation membrane module S100 of the embodiment in Section II includes a module vessel S110 and a hollow fiber element S200 attached thereto in a replaceable manner.

Module vessel S110 has an internal space S111 of substantially cylindrical shape in this example, and hollow fiber element S200 is inserted into space S111. Internal space S111 may be defined by long module pipe S112. The module pipe S112 have a substantially constant inner diameter. Thus, the favorable seal may be provided between hollow fiber element S200 and module pipe S112 by O rings SR1 and SR2, later described.

Lid members S113A and S113B are attached at both end portions of module pipe S112, and these components constitute module vessel S110. The module vessel S110 has a mixed gas inlet S110a formed at one end portion and a purge gas inlet S110d and a non-permeated gas outlet S110b formed at the other end portion and near that end portion, respectively. Module vessel S110 has a permeated gas outlet S110c in a peripheral wall portion.

Each of module pipe S112 and lid members S113A and S113B may be made of any material having sufficient strength and rigidity and ensuring safety in use. Examples of the material include metal, plastic, glass fiber composite material, and ceramic.

Space S115 (see FIG. 8 and FIG. 9) within module vessel S110 is formed upstream of tube sheet S220A of hollow fiber element S200, and a mixed gas flows into space S115 through mixed gas inlet S110a. Space S116 is formed downstream of tube sheet S220B, and a non-permeated gas, which has not permeated the hollow fiber membranes, flows into the space S116. The gas separation is described later in more detail.

Figure 10:
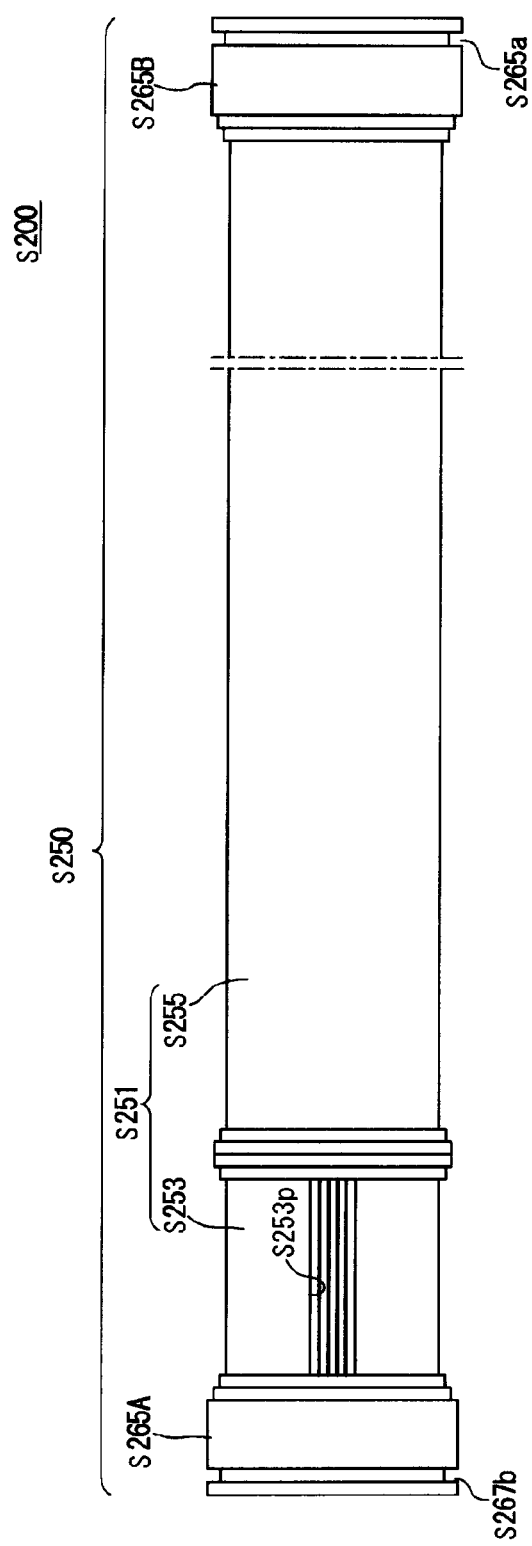
FIG. 10 is an external view showing the configuration of the hollow fiber element (particularly, an element case) in Section II.

As shown in FIG. 10, the hollow fiber element S200 is formed substantially in elongated cylindrical shape, and has a hollow fiber bundle (see also FIG. 9) provided by bundling a plurality of hollow fiber membranes with permselectivity, tube sheets S220A and S220B formed at both end portions of the hollow fiber bundle, and element case S250 housing them.

The hollow fiber element S200 can be changed in diameter and length as appropriate, and is not limited to the shape as shown in FIG. 10.

The shape of the hollow fiber bundle is not particularly limited. For example, the hollow fiber bundle may be provided by bundling the hollow fiber membranes in rectangular column shape or flat plate shape, and the tube sheet may have a rectangular parallelepiped shape. In terms of ease of manufacture and the resistance to pressure of the vessel, the hollow fiber bundle collected in cylindrical shape and the tube sheet in disc shape are preferably used.

The hollow fiber membrane can be provided by using a conventionally known one having permselectivity. The hollow fiber membrane may have a homogeneous structure or a heterogeneous structure such as of a composite membrane and an asymmetric membrane. For gas separation, an asymmetric membrane made of aromatic polyimide is appropriate due to high selectivity and high gas permeance, for example. The membrane having a thickness of 20 to 200 μm and an outer diameter of 50 to 1000 μm can be preferably used. An example of the material of the hollow fiber membrane is a polymer material, and particularly polyimide, polysulfone, polyetherimide, polyphenyleneoxide, and polycarbonate. The hollow fiber bundle may be provided by bundling approximately 100 to 1,000,000 hollow fiber membranes, for example.

Material of the tube sheet can be a conventionally known one and is not particularly limited, and examples thereof include a thermoplastic resin such as polyethylene and polypropylene, and a thermosetting resin such as epoxy resin and urethane resin. The tube sheet is basically responsible for fixing (securing) a plurality of hollow fiber membranes.

A core pipe S225 passes substantially through the center of the hollow fiber bundle. By way of example, the core pipe S225 is a member closed at one end and opened at the other end and is oriented with the opening portion located closer to tube sheet S220B. Core pipe S225 extends through tube sheet S220B, and the one end portion of core pipe S225 may be embedded in upstream tube sheet S220A. Core pipe S225 has a plurality of holes S225a formed in the outer peripheral portion at positions closer to tube sheet S220B. The purge gas is fed through the opening portion (that is, purge gas inlet S110d) at the end portion of the core pipe and flows into the space between the hollow fiber membranes through holes S225a. The purge gas flows between the hollow fiber membranes as the countercurrent flow to the direction of the mixed gas flow to promote the permeation of the gas through the hollow fiber membranes.

The core pipe may be made of any material having sufficient strength and rigidity and ensuring safety in use. Examples of the material include metal, plastic, glass fiber composite material, and ceramic.

Next, the structure of element case S250 is described in detail.

Figure 11:
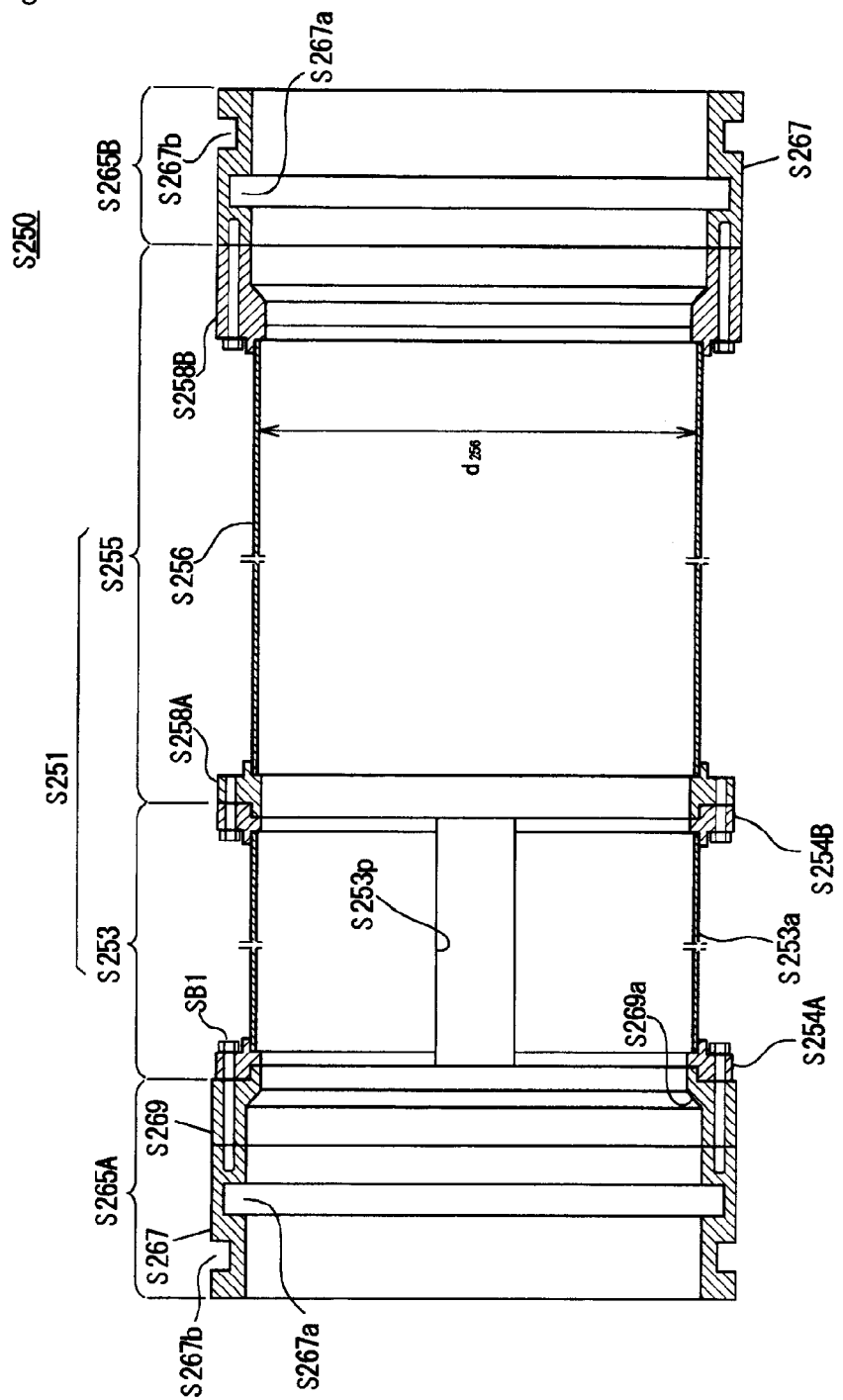
FIG. 11 is a section view of the element case in Section II.

Element case S250 is formed substantially in cylindrical shape and substantially surrounds the hollow fiber bundle and the outer peripheral portions of tube sheets S220A and S220B (except the end faces of the tube sheets). The term "substantially surrounding" is intended to include a partially unsurrounded portion since opening portion S253p or the like is formed, as later described. As shown in FIG. 10, element case S250 includes elongated tubular member S251 and tube sheet rings S265A and S265B (simply referred to as tube sheet ring S265 in some cases) attached at both end portions thereof and surrounding the outer peripheral portions of tube sheets S220A and S220B. As shown in FIG. 11, tubular member S251 is formed of half-split pipe S253 and gas guide pipe S255 in this case.

Each of half-split pipe S253, gas guide pipe S255, and tube sheet ring S265 may be made of any material having sufficient strength and rigidity and ensuring safety in use. Examples of the material include metal, plastic, glass fiber composite material, and ceramic. The length of gas guide pipe S255 is not particularly limited, and for example, may be half of the overall length of hollow fiber element S200 or longer, and preferably approximately 60% to 95%.

In the assembled state of hollow fiber element S200, the end faces of tube sheets S220A and S220B are exposed, and part of the hollow fiber bundle is exposed through opening portion S253p (described later in detail) formed in part of half-split pipe S253. This structure allows feed of the mixed gas from the end face of tube sheet S220A into the hollow fiber membranes, discharge of the gas (permeated gas) which has permeated the hollow fiber membranes and purge gas to the outside, and discharge of non-permeated gas from the end face of tube sheet S220B.

(a) Although the present embodiment includes tubular member S251 formed of two members S253 and S255, tubular member S251 may be formed of a single member or of three or more members.

(b) The shape, number, and position of opening portion S253p serving as the outlet of the permeated gas and the purge gas are not limited in any way. The opening portion may have a circular shape, an oval shape, a polygonal shape or the like. The opening portion can be formed in half-split pipe S253 and/or gas guide pipe S255. When tubular member S251 is formed of a single member, the opening portion may be provided in the outer peripheral portion of the member. The position of the opening portion is not particularly limited, but is preferably closer to tube sheet ring S265A.

(c) A plurality of opening portions may be placed at predetermined intervals along the outer peripheral portion of the tubular member. The opening portion is preferably formed near the permeated gas outlet since the gas discharge is favorably achieved through the opening portion and the permeated gas outlet.

As shown in FIG. 11, gas guide pipe S255 specifically includes pipe body S256 and connection members S258A and S258B provided at both end portions thereof. To favorably regulate the flow of the purge gas, pipe body S256 preferably has an inner peripheral portion substantially abutting on the outer peripheral portion of the hollow fiber bundle. In other words, inner diameter $d_{256}$ of pipe body S256 may be substantially equal to or slightly smaller than the diameter of the hollow fiber bundle. When inner diameter $d_{256}$ of pipe body S256 is smaller than the diameter of the hollow fiber bundle, the hollow fiber bundle may be placed under compression in a diameter direction within pipe body S256.

Pipe body S256 forming part of gas guide pipe S255 may be made of any material that does not allow the permeation of gas and can form element case S250, and the thickness of pipe body S256 is not particularly limited. For example, a metal plate having a thickness of approximately 0.5 mm to 7 mm, and preferably approximately 0.5 mm to 5 mm, may be curved to form pipe body Each of connection members S258A and S258B is a member in ring shape and is attached to pipe body S256 to serve as a flange portion for gas guide pipe S255. Each of connection members S258A and S258B may have a threaded screw hole or a through hole formed therein for inserting a fastening bolt. Pipe body S256 and the connection member (S258A or S258B) may be fixed to each other, for example by welding. Alternatively, a bolt or the like may be used, and in this case, any intermediate member (not shown) may be interposed between pipe body S256 and the connection member (S258A or S258B).

Figure 12:
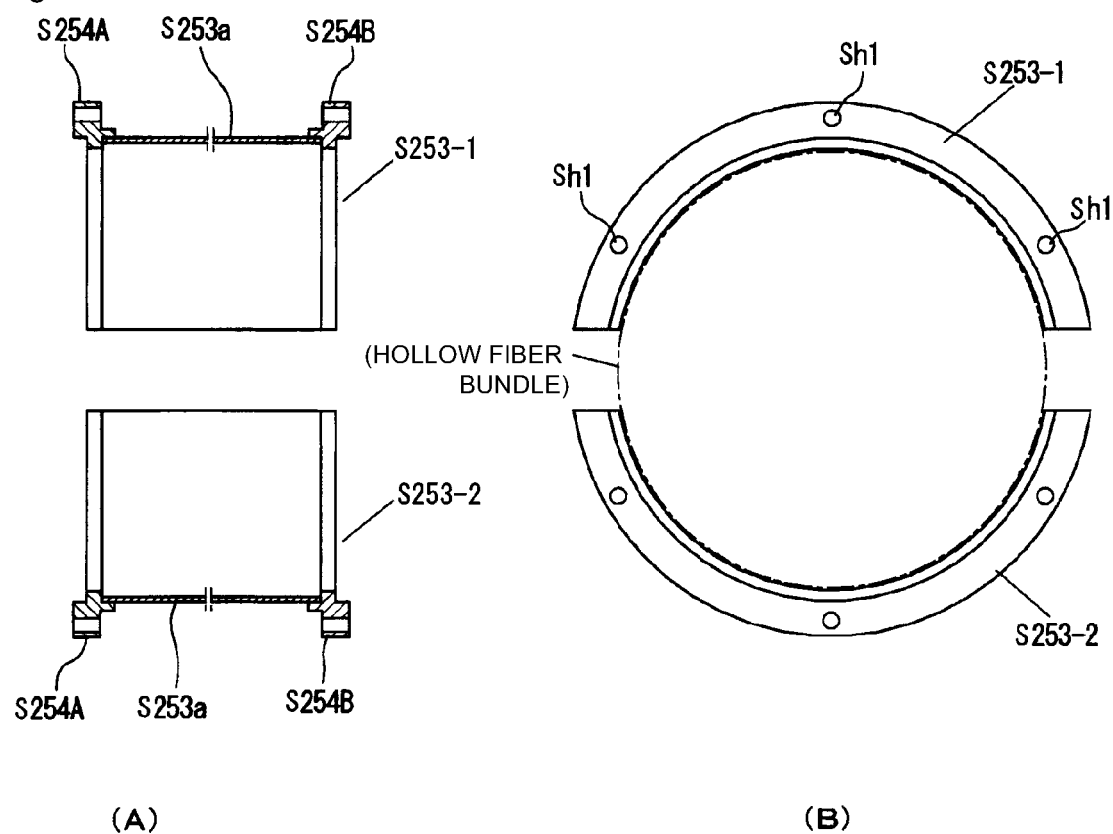
FIG. 12 is diagrams showing a half-split pipe in Section II.

As shown in FIG. 12, half-split pipe S253 includes a pair of members S253-1 and S253-2, each of which covers substantially half of the outer peripheral portion of the hollow fiber bundle. Each of members S253-1 and S253-2 includes half-pipe portion S253a having a substantially arc cross section and achieving the substantially same function as that of pipe body S256 described above, and connection members S254A and S254B in arc shape provided at both end portions of half-pipe portion S253a. Connection member S254 constitutes a flange portion and has through holes Sh1 formed therein for inserting fastening bolts.

Connection members S254A and S254B may be provided by dividing a preformed member in ring shape into two pieces and then cutting both end portions thereof off, for example.

(d) Although the present embodiment includes half-split pipe 253 formed of the pair of members S253-1 and S253-2, the pipe may be formed of a single or three or more members.

(e) Two or all of half-split pipe portion S253a and connection members S254A and S254B may be formed of a single member.

Referring again to FIG. 11, a tube sheet ring S265A has a seal ring S267 and a tapered ring S269. Seal ring S267 and tapered ring S269 have a ring shape and are connected to each other to align along an axis direction. Tube sheet ring S265B has only seal ring S267, because a component corresponding to tapered ring S269 is provided as part of gas guide pipe S255.

Seal ring S267 has an annular groove S267a formed in its inner peripheral portion for fitting an annular seal member. The seal member can be provided by using an O ring or packing to ensure the seal between the outer peripheral portion of the tube sheet and the inner peripheral portion of the seal ring. Seal ring S267 also has annular groove S267b formed in its outer peripheral portion for fitting an annular seal member. The seal member can be provided by using an O ring or packing to ensure the seal between the outer peripheral portion of seal ring S267 and the inner peripheral portion of module vessel S110 in a state where the hollow fiber element S200 is mounted.

As shown in FIG. 11, tapered ring S269 has a tapered portion 269a formed in its inner peripheral portion. The tapered portion S269a corresponds to a tapered portion (not shown) formed on the tube sheet and defines a position of the tube sheet (the position in the axis direction).

Seal ring S267 and tapered ring S269 are fixed to connection member S254A of half-split pipe S253 by using fastening bolts SB1.

Hollow fiber element S200 of the present embodiment configured as above is removably mounted on module vessel S110. Specifically, for mounting it from the side of module vessel S110 closer to lid member S113A, the hollow fiber element S200 will be inserted into module vessel S110 to a predetermined position, with lid member S113A removed (see FIG. 8). As a result, a purge gas introducing tube S118 is connected to the purge gas inlet S110d of hollow fiber element S200 to complete mounting. Hermeticities between outer peripheral portions of the tube sheet rings S265A and S265B and inner peripheral portion of the module vessel S110 are favorably ensured by O rings SR1 and SR2. Alternatively, hollow fiber element S200 may be inserted into module vessel S110 from the side closer to lid member S113B.

Gas separation membrane module S100 configured according to the present embodiment achieves the following gas separation by way of example.

For organic vapor separation, a mixed gas containing organic vapor and water vapor is first fed into space S115 through mixed gas inlet S110a. The mixed gas then enters the hollow fiber membranes from its opening portion at the end thereof and flows through the membranes, and during this process, a certain component gas of the mixed gas permeates the hollow fiber membranes and is let out from the membranes. Gas (permeated gas) permeated from the hollow fiber membranes is then discharged outside hollow fiber element S200 through opening portion S253p, and is further discharged outside module vessel S110 through permeated gas outlet S110c. In contrast, non-permeated gas which has not permeated the hollow fiber membranes flows downstream through hollow fiber membranes, are directed outside the membranes through the downstream opening portion, and flows into space S116. The non-permeated gas is discharged outside through non-permeated gas outlet S110b. Since the hollow fiber membrane has the permselectivity, permeated gas which has permeated the membranes is rich in the water vapor serving as the highly permeated component, whereas non-permeated gas discharged through the non-permeated gas discharge port contains the water vapor serving as the highly permeated component at a reduced concentration.

During gas separation, purge gas is introduced through the purge gas inlet S110d and flows into the hollow fiber bundle through core pipe S225. In the present embodiment, at least the gas guide pipe S255 regulates gas flow direction similarly to a conventional carrier gas guide film, the purge gas flows in the direction as the countercurrent flow to the mixed gas to increase the efficiency in gas separation with the hollow fiber membranes. Similarly to the permeated gas, the purge gas is discharged outside hollow fiber element S200 through an opening portion S253p formed therein and is then discharged outside the module vessel S110 through permeated gas outlet S110c thereof.

As described above, the hollow fiber element S200 in the present embodiment includes a tubular member S251 surrounding outer periphery of the hollow fiber bundle for regulating direction of gas flow, and the tubular member S251 is rigid rather than flexible unlike the conventional film, therefore it is possible to prevent the problem of such a film contacting the module vessel or the like and thus being damaged during replacement of hollow fiber element S200, as seen in the conventional configuration. In addition, since the tube sheets are also surrounded by tube sheet rings S265A and S265B, the possibility of damaging the tube sheets is also reduced.

In organic vapor separation, a mixed gas at high pressure may be fed to swell the hollow fiber membranes. According to the configuration of the present embodiment, however, the tubular member S251 (particularly, gas guide pipe S255) surrounds the outer periphery of the hollow fiber bundle to prevent the possibility of any breakage of the film (particularly, an attached portions of the film) which may occur in the conventional configuration due to the swelling of the hollow fiber membranes.

The hollow fiber element S200 according to the present embodiment can be easily mounted on module vessel S110 as shown in FIG. 8. Seal can be favorably ensured by O rings SR1 and SR2 because the internal space S111 of module vessel S110 has a substantially constant diameter. As obvious from FIG. 8, outer diameters of tube sheet rings S265A and S265B are formed to be larger than the outer diameter of tubular member S251.

[Example of Manufacture Method]

Next, description is made of an exemplary method of manufacturing the gas separation membrane module described above. According to the configuration of the present embodiment, since tubular member S251 is formed not of a single member but of the gas guide pipe S255 and the half-split pipe S253, the following manufacturing method can be used, where the outer peripheral portions of tube sheets S220A and S220B do not need to be adhered to the inner peripheral portion of tube sheet ring S265.

First of all, a gas guide pipe S255 to which the tube sheet ring S265B connected at its end portion as shown in FIG. 13(A) shows is prepared.

Next, as shown in FIG. 13(B), a hollow fiber bundle (core pipe is not shown) produced in conventionally known method is inserted into gas guide pipe S255 and tube sheet ring S265B to protrude an end portion of the hollow fiber bundle from tube sheet ring S265B. Then, a tube sheet S220B is formed by curing resin with a mold, not shown, at the end portion of the hollow fiber bundle. After the formation of tube sheet, a step of cutting part of the tube sheet to open the end portion of the hollow fiber membranes can be performed in the same manner as that in the conventional method.

Figure 13:
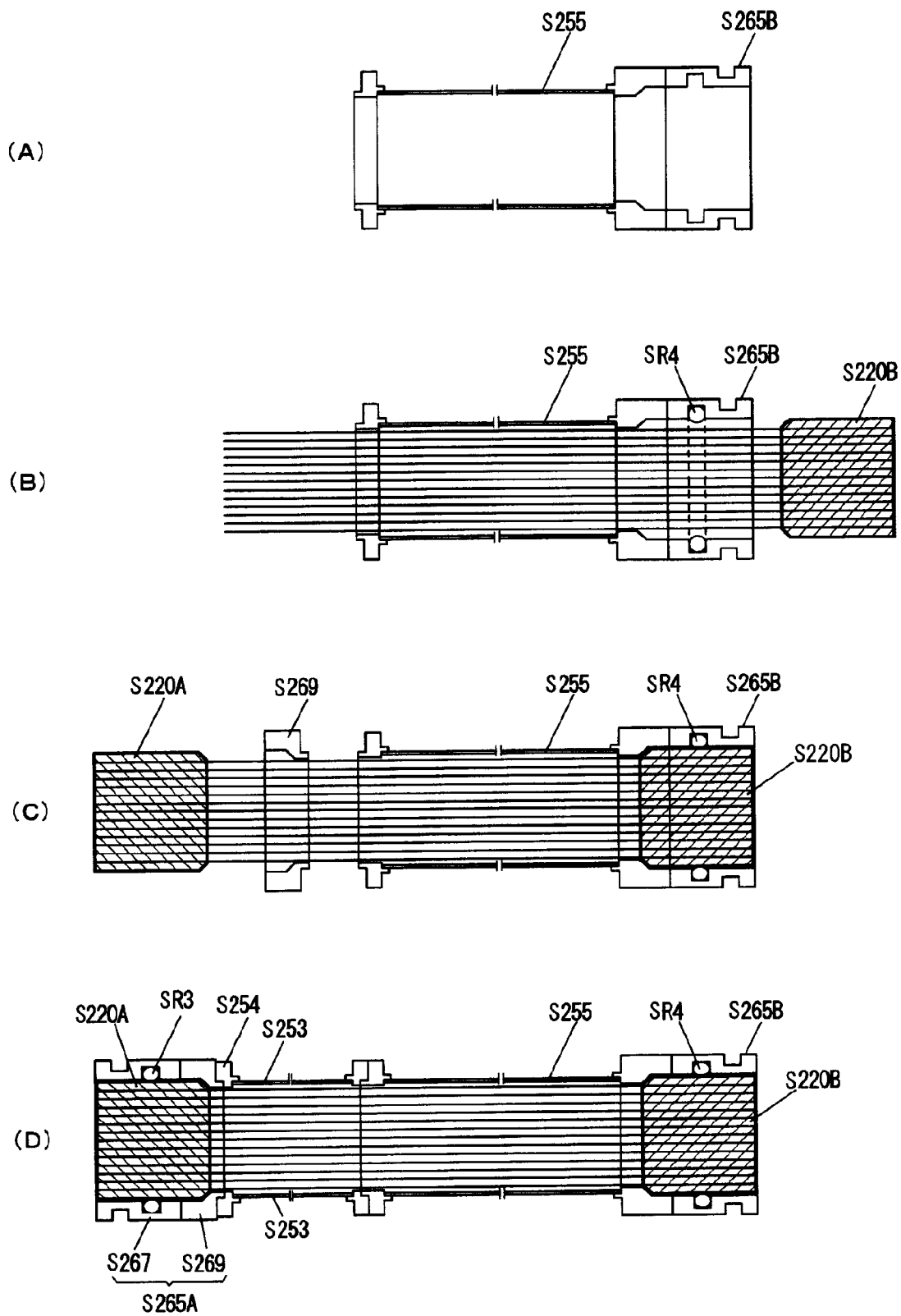
FIG. 13 is diagrams showing an exemplary method of manufacturing the hollow fiber element in Section II.

Although FIG. 13 shows the hollow fiber bundle disposed horizontally, it goes without saying that a hollow fiber bundle may be disposed vertically and the mold may be attached at the bottom of the bundle to form the tube sheet. In addition, tube sheet ring S265B may not be connected at the step shown in FIG. 13(B), and tube sheet rings S265A and S265B may be attached at a later step after the formation of tube sheets S220A and S220B (described later in detail).

Next, as shown in FIG. 13(C), the tube sheet S220B formed is inserted into the tube sheet ring S265B, and O ring SR4 is used to provide a seal between the tube sheet S220B and tube sheet ring S265B. Then, similarly to the above step, the other tube sheet S220A is formed by curing resin with a mold, not shown, at the opposite end portion of the hollow fiber bundle. After the formation of the tube sheet, a step of cutting part of the tube sheet to open the end portion of the hollow fiber membranes can be performed in the same manner as that in the conventional method. In the state shown in FIG. 13(C), a tapered ring S269 is placed between tube sheet S220A and gas guide pipe S255.

Next, as shown in FIG. 13(D), half-split pipe S253 is attached between tapered ring S269 and gas guide pipe S255, and the fastening bolt (not shown) is inserted through connection member S254 of half-split pipe S253 to fix seal ring S267 and tapered ring S269. O ring SR3 provides a seal between tube sheet S220A and seal ring S267.

Through the series of steps described above, hollow fiber element S200 of the present embodiment is completed.

Although one embodiment of the present invention in Section II has been described with reference to the drawings, the present invention in Section II is not limited thereto, and various modifications can be made:

(a) The tube sheet may secure only one end portion of the hollow fiber bundle. In the hollow fiber element in which the tube sheet secures only one end portion, the other end portion is configured such that hollow fibers are not opened. For example, the hollow fiber membranes may be folded;

(b) Although the above description has described the configuration in which the outer peripheral portion of the tube sheet is not secured to the inner peripheral portion of the element case, and seal between them is ensured by the O ring, an outer peripheral portion of the tube sheet may be secured to the inner peripheral portion of the element case;

(c) In addition to annular rings S265A and S265B surrounding only the outer peripheral portions of the tube sheets, member at the end portion of the element case may be a cap member shaped to cover the end face of the tube sheet (and having a gas port formed therein as required);

(d) Although the above description has disclosed the configuration of the so-called bore feed type and feeding the purge gas, the present invention in Section II is applicable to a hollow fiber element of a so-called shell feed type, and is also applicable to a configuration in which no purge gas is fed. The application of the gas separation is not limited in any way;

(e) Seal ring S267 and tapered ring S269 (see FIG. 9) may not be formed as the separate members but may be formed as an integral component;

(f) With respect to the configuration of gas guide pipe S255, the above description has shown the example in which gas guide pipe S255 is formed of the three components including pipe body S256 and two connection members S258A and S258B, but the present invention in Section II is not limited thereto. It is possible to use a component shaped such that all of pipe body S256 and connection members S258A and S258B are integrated, or pipe body S256 and one of connection members S258A and S258B are integrated into one component; and (g) Gas guide pipe S255 and seal ring S267 may be formed into an integral component.

(The Invention Disclosed in Section II)

1. A hollow fiber element including:

a hollow fiber bundle provided by bundling a plurality of hollow fiber membranes with permselectivity;

a tube sheet disposed at least at an end portion of the hollow fiber membranes and fixing the hollow fiber membranes;

a core pipe placed substantially at the center of the hollow fiber bundle and configured to feed a purge gas to an external space of the hollow fiber membranes; and an element case housing the hollow fiber bundle and the tube sheet, the hollow fiber element being of a bore feed type in which a mixed gas is introduced into the hollow fiber membranes, wherein the element case includes:

a tubular member having an opening portion formed on an outer peripheral portion for discharging gas, surrounding the hollow fiber bundle, the tubular member configured to define flows of gases so that mixed gas within the hollow fiber membranes is a countercurrent flow against the purge gas outside the hollow fiber membranes; and an end portion member attached to one end or both ends of the tubular member.

2. The hollow fiber element according to 1, wherein the tubular member includes:

a first pipe surrounding part of the hollow fiber bundle in a longitudinal direction; and a second pipe, connected to an end portion of the first pipe, said pipe substantially surrounding the remaining portion of the hollow fiber bundle.

3. The hollow fiber element according to 2, wherein the second pipe includes two or more members partially covering an outer peripheral portion of the hollow fiber bundle.

4. The hollow fiber element according to any one of 1 to 3, wherein the end portion member is a tube sheet ring in ring shape surrounding an outer peripheral portion of the tube sheet, and an annular seal member is placed between the tube sheet and the tube sheet ring.

5. The hollow fiber element according to any one of 1 to 4, wherein the end portion member has an annular groove, formed on its outer peripheral portion, in which an annular seal member is disposed.

6. A hollow fiber element including:

a hollow fiber bundle provided by bundling a plurality of hollow fiber membranes with permselectivity;

a tube sheet disposed at least at an end portion of the hollow fiber membranes and fixing the hollow fiber membranes; and an element case housing the hollow fiber bundle and the tube sheet, wherein the element case includes:

a tubular member including a first pipe surrounding part of the hollow fiber bundle in a longitudinal direction and a second pipe connected to an end portion of the first pipe and substantially surrounding the remaining portion of the hollow fiber bundle; and an end portion member attached to one end or both ends of the tubular member.

7. A gas separation membrane module including:

the hollow fiber element according to any one of 1 to 6; and a module vessel into which the hollow fiber element is removably mounted.

8. The gas separation membrane module according to 7, wherein the module vessel includes a module pipe providing a substantially cylindrical internal space in which the hollow fiber element is placed, and the internal space has a diameter formed to be substantially constant.

DESCRIPTION OF THE REFERENCE NUMERALS

100 GAS SEPARATION MEMBRANE MODULE
110 MODULE VESSEL
110a MIXED GAS INLET
110b NON-PERMEATED GAS OUTLET
110c PERMEATED GAS OUTLET
110d PURGE GAS INLET
114 HOLLOW FIBER MEMBRANE
115 HOLLOW FIBER BUNDLE
111, 112, 113 SPACE
120-1, 120-2 (120) TUBE SHEET
120A HOLLOW FIBER MEMBRANE EMBEDDED PORTION
120B SOLID PORTION
125 REINFORCING FIBER CLOTH
S100 GAS SEPARATION MEMBRANE MODULE
S110 MODULE VESSEL
S110a MIXED GAS INLET
S110b NON-PERMEATED GAS OUTLET
S110c PERMEATED GAS OUTLET
S110d PURGE GAS INLET
S111 SPACE
S112 MODULE PIPE
S113A, B LID MEMBER
S118 PURGE GAS INTRODUCING TUBE
S200 HOLLOW FIBER ELEMENT
S220A, 220B TUBE SHEET
S250 ELEMENT CASE
S251 TUBULAR MEMBER
S253 HALF-SPLIT PIPE
S253a HALF-SPLIT PIPE BODY
S253p OPENING PORTION
S254A, 254B CONNECTION MEMBER
S255 GAS GUIDE PIPE
S256 PIPE BODY
S258A, 258B CONNECTION MEMBER
S265A, 265B TUBE SHEET RING
S267 SEAL RING
S267a, 267b ANNULAR GROOVE
S269 TAPERED RING
Sh1 THROUGH HOLE
SR1 TO SR4 O RING

The invention claimed is:

1. A gas separation membrane module, comprising:

a hollow fiber bundle provided by bundling a plurality of hollow fiber membranes with permselectivity;

a module vessel in which the hollow fiber bundle is placed; and a tube sheet fixing the plurality of hollow fiber membranes at an end portion of the hollow fiber bundle, wherein a cross section of the tube sheet includes a hollow fiber membrane embedded portion in which the hollow fiber membranes are embedded and a solid portion in which no hollow fiber membrane is embedded, the solid portion located outside the hollow fiber membrane embedded portion, and some, but not all of the plurality of hollow fiber membranes are wound within a reinforcing fiber cloth within the hollow fiber membrane embedded portion, wherein a length of the reinforcing fiber cloth embedded in the tube sheet is 50% to 90% of a thickness of the tube sheet.

2. The gas separation membrane module according to claim 1, wherein the reinforcing fiber cloth is an inorganic fibrous woven cloth.

3. The gas separation membrane module according to claim 1, wherein the reinforcing fiber cloth is a glass fiber cloth.

4. The gas separation membrane module according to claim 1, wherein the reinforcing fiber cloth is placed in a spiral shape.

5. The gas separation membrane module according to claim 1, wherein the reinforcing fiber cloth is placed in a circular shape.

6. The gas separation membrane module according to claim 1, further comprising tube sheets disposed at both end portions of the hollow fiber bundle,
- wherein at least some of the plurality of hollow fiber membranes are wound with the reinforcing fiber cloth within each of the tube sheets.

7. The gas separation membrane module according to claim 1, wherein at least one of the plurality of hollow fiber membranes is a gas separation membrane for organic vapor separation.

8. The gas separation membrane module according to claim 1, further comprising;
- a core pipe being a hollow member for feeding a purge gas into the module and placed substantially at the center of the hollow fiber bundle.

* * * * *